United States Patent [19]
Kamimura et al.

[11] Patent Number: 5,308,409
[45] Date of Patent: May 3, 1994

[54] METHOD OF STRENGTHENING ALUMINUM CASTINGS IN A SPECIFIED LOCAL PART

[75] Inventors: Tadashi Kamimura, Yokohama; Akira Tsujimura, Chigasaki, both of Japan

[73] Assignee: Isuzu Motor Limited, Tokyo, Japan

[21] Appl. No.: 689,218

[22] Filed: Apr. 22, 1991

[30] Foreign Application Priority Data

Apr. 23, 1990 [JP] Japan .................. 2-105282

[51] Int. Cl.5 .............................. C22F 3/00
[52] U.S. Cl. .................. 148/512; 148/516; 148/524; 148/525; 148/527; 148/531; 148/535; 219/76.1; 219/76.13; 219/76.14; 219/76.15; 219/76.16
[58] Field of Search ........... 148/512, 516, 524, 525, 148/527, 531, 535; 219/76.1, 76.13, 76.14, 76.15, 76.16; 428/546, 548, 558, 559

[56] References Cited

U.S. PATENT DOCUMENTS

| | | |
|---|---|---|
| 3,310,423 | 3/1967 | Ingham, Jr. .................. 219/76.1 |
| 3,428,442 | 2/1969 | Yurasko, Jr. et al. .......... 29/191.2 |
| 4,233,490 | 11/1980 | Shalai et al. ................ 219/121 P |
| 4,401,726 | 8/1983 | Gnanamuthu .................. 428/610 |

FOREIGN PATENT DOCUMENTS

| | | |
|---|---|---|
| 0095604 | 12/1983 | European Pat. Off. . |
| 2096514A | 10/1982 | United Kingdom . |
| 1138974 | 1/1989 | United Kingdom . |

OTHER PUBLICATIONS

*Welding International*, vol. 2, No. 6, 1988, pp. 510–513, V. R. Ryadov, et al., entitled "Local Hardening of Components of Aluminum Alloys".

*Primary Examiner*—R. Dean
*Assistant Examiner*—Robert R. Koehler
*Attorney, Agent, or Firm*—Dykema Gossett

[57] ABSTRACT

A method of strengthening an aluminum casting by modifying qualities of a specified part thereof comprises the steps of forming a weld overlay on the specified part using powders made of heat resisting element and remelting the specified part, now overlaid with the layer of heat resisting alloy layer, using high density energy.

19 Claims, 2 Drawing Sheets

METHOD OF STRENGTHENING ALUMINUM CASTINGS IN A SPECIFIED LOCAL PART

BACKGROUND OF THE INVENTION

1. Technical Field

The present invention relates to a method of strengthening a specified part of an aluminum casting such as a cylinder head of an engine.

2. Background Art

Cylinder heads of recent automotive engines bear greater thermal load as well as mechanical load as the engine output has been raised. Referring to FIG. 7 of the accompanying drawings, such an increase in the loads sometimes results in thermal cracking in a bottom face of a cylinder head 1 between an intake port 3 and an exhaust port 4 or between these ports and a fuel injection nozzle port 5, i.e., an intervalve part 6, which is thinner than other portions. Therefore, the intervalve part 6 should be strengthened to prevent the cracking. In other words, the intervalve part 6 is a part to be reinforced by the present invention (referred to as the "object part" hereinafter).

Referring to FIG. 8, a hatched potion in a piston 7, namely, a part that surrounds a combustion chamber 8, is also a part that has to bear a particularly high load and the object part of the present invention.

Conventionally, the following methods are available to strengthen the object part:

1. The alloying method: The object part is added with one or more of suitable heat resisting elements (e.g., Cr, Mo, Cu, and Ni) in an appropriate amount so as to improve the high temperature strength.

2. The cast-over method: The object part is covered or cast over, with steel or heat resisting material.

3. The grain refinement method: The object part is added with Sr or Ti of an appropriate amount so as to refine its granular structure on solidification, which brings about improvement in the resistance to thermal cracking through improved tensile strength and ductility.

4. The hard alumite treatment method: A hard alumite film of 100 micrometers or so in thickness is formed on the surface of the object part so as to improve the thermal resistance.

5. The remelting method: The object part is melted once again using a high density energy, such as laser beam, electron beam and TIG arc, so as to refine its granular structure on rapid solidification, bringing about improved high temperature strength.

However, these methods are not without drawbacks, as follows:

1. The alloying method: This method is not only rather expensive, but is liable to degrade, contrary to the present invention, the productivity and the high temperature strength because the castability is generally deteriorated on alloying, causing shrinkages and other casting defects or micro-shrinkages to form.

2. The cast-over method: This method needs the alumunizing treatment to be conducted on the steel material to be cast over. In addition, a great deal of care has to be paid about oxidation prevention, rigid control of casting temperature and post-casting non-destructive testing, calling for a large increase in the labor cost.

3. The grain refinement method: The benefit of this method is as small as it is convenient to practice.

4. The alumite treatment method: The effect of improving the heat resistivity of this method is greater than the methods 1 and 3, but all parts other than the object part must be covered with a masking so as to protect them from forming alumite film at an expense of additional labor and degradation in productivity.

5. The remelting method: This method is easy to practice and the benefit can be quite large, but the strengthening obtainable is not sufficient to attain the level desired here.

To realize such a level of strengthening as required for an automotive engine part, a method that combines the methods 1 and 5, i.e., the one called the remelting alloying method, has been proposed. In this method, the object part is remelted with a plasma welding machine and is added with a heat resisting element, e.g., Ni, Cu, Cr, Mo, W and the likes, in the powdery form singly or in combination. Since this method is capable of forming an alloy overlay having a higher content of heat resisting element or elements than the simple remelting method is able to, the object part ends up with having its heat and werar resistances much improved.

Though quite effective, this method has following drawbacks:

(a) When added singly in the powdery form, the heat resisting element is not very soluble in the molten base metal of Al, so that cracks are apt to occur at the interface between the alloy overlay and the base metal;

(b) When added in combination, cracks are apt to occur also, now because of the difference in the rate of shrinkage existing among the portions of the overlay if mixing is not homogeneous; and (c) When a plasma welder is used, the gas contained in blowholes of the Al metal is liberated on melting, ending up entrapped in the weld overlay, making its porosity high.

SUMMARY OF THE INVENTION

The primary purpose of the present invention resides in providing a method of increasing the heat resistance and the wear resistance of an aluminum casting markedly by strengthening the specified local part (the "object part) thereof.

Another purpose of the present invention resides in providing a method of strengthening an Al casting in the object part that effectively prevents the occurrence of cracking and gas defects.

According to one aspect of the present invention, there is provided a method which comprises a step of making a weld overlay on the object part while adding powder heat resisting elements (the "additive" or "additive powders") thereinto and a step of remelting the weld overlay thus formed once again using high density energy.

Here, it is preferred that the additive powder be of Ni, although it can be of any heat resisting element such as Cr and Mo; that, in making the weld overlay, the plasma welding method be practiced using a plasma welding machine; and that, in performing the remelting, the TIG arc generated by TIG welding torch be used for the high density energy, although any of the electron beam, laser beam and plasma arc techniques can be used.

Moreover, it is preferred that the additive powders be of the capsule particles, each of which being composed of a particle of the additive concerned as the core and particles of a metal that has a sufficient solubility in Al as as the encapsulating material, the core additive being preferably Ni, although it may be any heat resisting element, such as Cr, Mo, and the like, while the encapsulating particles are preferably Al, although they may be Cu or Cu alloy, which are soluble in Al.

According to another aspect, the present invention provides a method that comprises a step of making a composite welding wire by filling a sheathing with the capsule particles, each of which is composed of a core particle of the additive and the encapsulating metallic particles, a step of making a weld overlay on the object part with the composite wire as a filler, and a step of remelting the overlay thus formed using a high density energy.

Here, it is preferred that the core be Ni, although it may be any heat resisting element such as Cr and Mo; that the encapsulating particles be Al, although they may be of Cu or Cu alloy; that the sheathing be of a metal that is soluble in Al and is ductile; that the overlay welding be conducted in the MIG welding practice using an MIG welding machine; while the remelting be conducted by projecting a TIG arc using a TIG welding torch, although any of electron beam, laser beam, or plasma arc may be used.

According to still another aspect, the present invention provides a method that comprises a step of making a composite welding wire by filling a sheathing with the capsule particles, each being composed of a core particle of the additive and the encapsulating metallic particles, a step of forming a heat resisting alloy layer by making a weld overlay on the object part with the composite wire as a filler and a step of forming a remelted alloy layer by remelting the overlay thus formed using a high density energy.

The benefits attainable with the present invention are as follows:

The use of any of the above-described methods will result in attaining greatly improved heat resistance and wear resistance as well as effective prevention of weld defects such as initiation of cracks by improving the mixing of the additive in the base metal;

The advantage of the first method, wherein the overlay welding is conducted in the plasma welding method, is that the additive can be fed as they are, i.e., without any pretreatment or modification;

The advantage of the second method, wherein the capsule particles, each composed of the additive as a core and metallic particles that are soluble in Al as the encapsulating material, are used, a remelted alloy layer of homogeneous additive distribution is formed quite readily; and The advantage of the third method, wherein a composite filler wire is made by filling a sheathing with the capsule particles, a weld overlay is made using the composite wire thus made, and the overlay thus made is remelted using a high density energy, a marked improvement in the productivity is attained in addition to the greatly improved heat resistance and the effective prevention of weld defects.

DESCRIPTION OF THE PREFERRED EMBODIMENTS

Figure 1:
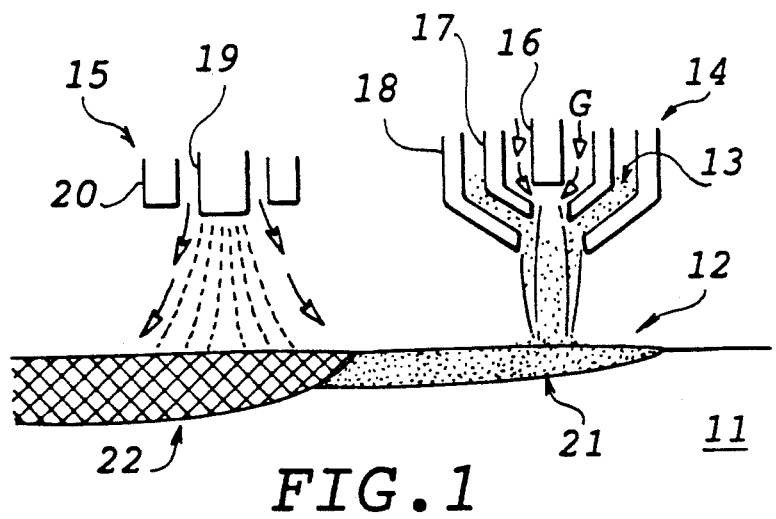
FIG. 1 is a schematic sectional view of welding devices and a welded part, showing the first embodiment of the present invention for modifying the qualities of the specified local part (the "object part") of an aluminum casting.

Now, in disclosing embodiments of the present invention referring to the attached drawings, FIG. 1 illustrates the first embodiment of the method of strengthening aluminum casting by modifying qualities of the specified local part (the "object part") according to this invention. In this embodiment, an aluminum casting 11, such as an automotive cylinder head, is overlaid on its object part 12 using powders of heat resisting element 13, which are the alloying additives desired (the "additive"), by means of a plasma welder 14, then the overlay thus formed is remelted by means of a TIG torch 15.

In this instance, the plasma welder 14 comprises an electrode (tungsten rod) 16 to strike up arcs with, an inner nozzle 17 through which the working gas G is jetted out surrounding the electrode 16, and an outer nozzle 18 to feed the welding powder with. Here, the combined function of the inner nozzle 17 and the working gas G is to concentrate the arc so as to raise the energy density as well as to perform the spray overlaying by blowing the welding powders onto the base metal, the powder being of Ni, the heat resisting elment to be added to the object part.

The TIG torch 15, which is a TIG welder, comprises an electrode 19 to strike up arcs with and a nozzle 20 to jet out a shielding inert gas.

The plasma welder 14 and the TIG torch 15 are aligned in tandem at a predetermined interval, the plasma welder 14 preceding. Namely, first Ni powders are plasma sprayed on the object part 12 so as to from an overlay, which is now an alloy layer 21, made heat resisting owing to addition of Ni, and immediately thereafter, the object part 12 is remelted by the TIG torch so as to form a remelted alloy layer 22, which is now more homogeneous in the distribution of Ni than before.

An obvious advantage of this embodiment is that Ni of high concentration can be easily obtained, so that the heat resistance is greatly improved and formation of cracks and gas defects are effectively prevented on remelting, which also improves solubility of the additive. Another advantage resides in the use of the plasma welder 14 in making the overlay: this allows the use of Ni powders as they are, i.e., without pretreatment or modification, making the process quite practicable.

The third advantage arises from the use of the TIG torch 15 as a source of high density energy to perform the remelting. Namely, to use a plasma welder for adding heat resisting elements to a local part of an article in the form of welding powders, operation conditions such as welding current, welding voltage, transfer speed of electrode and rate of powder feeding, should be predetermined and controlled precisely. Whereas the second stage remelting process conducted using a high density energy according to the present invention not only eases these requirements but allows the first stage plasma welding to finish not so perfectly as usually demanded. This makes the process practice much easier to perform, thereby improving the productivity greatly.

In this form of embodiment, moreover, other sources of high density energy such as electron beam, laser beam and plasma arc may be used in place of the TIG torch 15. As for the additive, other kinds of heat resisting elements such as Cr, Mo and the like may be used in place of Ni. Also, the additive powders may consist entirely of capsule particles that are composed of two different kinds of particles.

Figure 2:
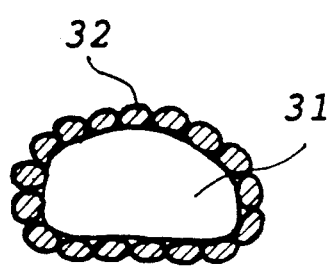
FIG. 2 is a schematic cross section of an incomplete or unfinished capsule particle to be used as the welding powder in the process of FIG. 1.
Figure 3:
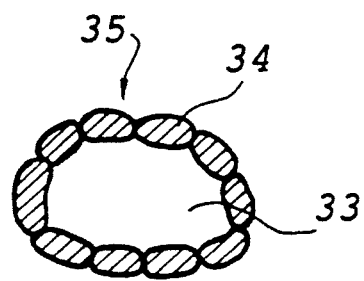
FIG. 3 is a cross section of a complete capsule particle.

Now, the capsule particles mentioned above, which give rise to an important variation in this invention to be the second embodiment, can be made as shown in FIG. 2. At first, Ni particles 31 are prepared so as to be the core. Then, Al particles 32 of a diameter about 1/10th of the Ni particles 31 are electrostatically adhered onto the core particles 31. Then those particles are charged into a vessel which is equipped with a vane rotating at 8,000 to 16,000 rpm (i.e., a centrifugal roll-forming machine), and are subjected to the action of the air stream generated by the rotating vane for 1 to 10 minutes. Owing to the impact forces impacted by the air streem, the Al particles 52 are bonded firmly to the Ni particle 31, so that capsule particles 35, now composed of a Ni particle 31 as a core and numerous smaller Al particles 32 as the encapsulating particles, are obtained.

The advantage of the use of the capsule particles 35 is as follows: since the covering of each capsule particle 35 is Al, it is dissolved easily in the base metal, making mixing of Ni with the base Al highly homogeneous, thus improving the quality of alloy layers 21 and 22 further. Here, any metal that is sufficiently soluble in Al such as Cu and Cu alloys may be used for the encapsulating particles insted of Al while any heat resisting element such as Cr and Mo may be used for the core instead of Ni.

Figure 4:
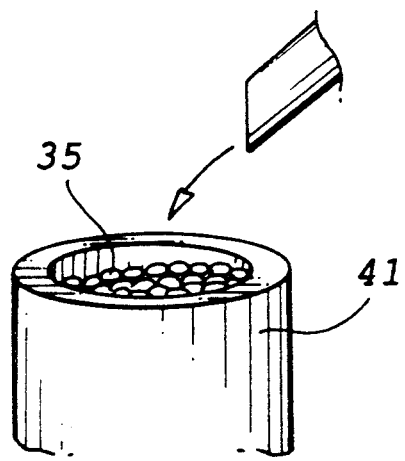
FIG. 4 is schematic view useful to explain the process of manufacturing a composite wire, which is used in the second embodiment method of the present invention.
Figure 5:
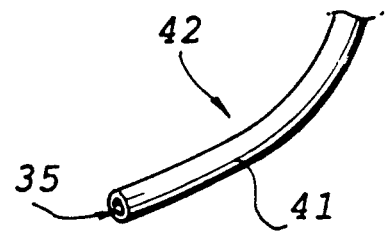
FIG. 5 is a schematic oblique view of a complete composite wire.

In the third embodiment, this invention provides for the use of a MIG welder, the kind of welding machine that is used in the industry for its high welding speed, in place of the plasma welder 14 of the foregoing embodiments. For this, the use of the capsule particles 35 is preferred. As shown in FIG. 4, a sheathing 41, which is an aluminum tubing in this instance, is filled with capsule particles 35, now preferably agglomerated suitably, and drawn into a composite wire 42 of a diameter between 0.8 and 1.6 mm, namely in a manner of manufacturing known fluxcored welding wires.

Figure 6:
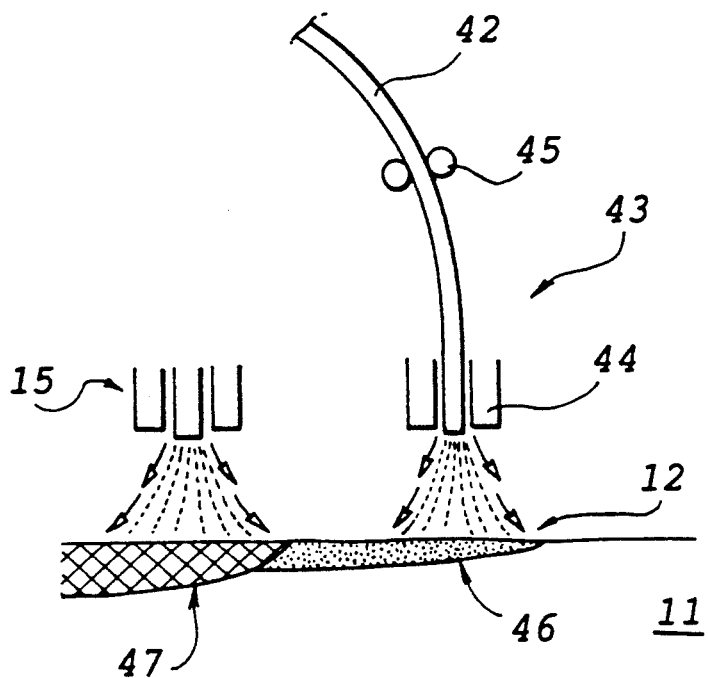
FIG. 6 shows schematic sections of welding devices and a welded part, useful to explain a method using a composite wire.
Figure 7:
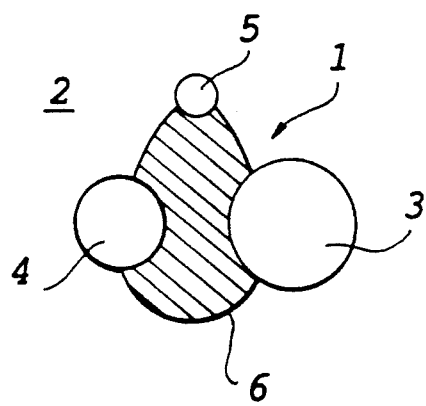
FIG. 7 is a schematic view showing the bottom face of a cylinder head, which is an aluminum casting, used to discuss problems existing in the currently available technology.
Figure 8:
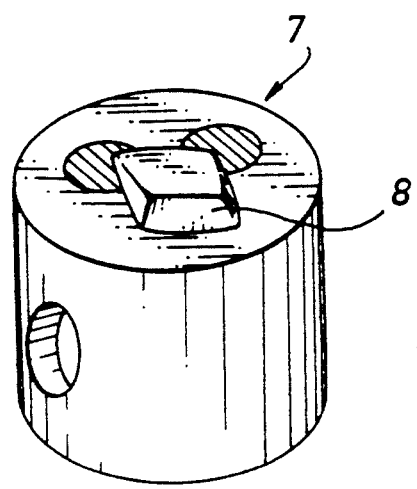
FIG. 8 is a schematic oblique view of a piston to discuss the problems existing in the currently available technology.

The strengthening of the object part is performed as shown in FIG. 6. A composite wire 42 is set on a MIG welder 43, which is complete with a nozzle 44 to blow out the shielding inert gas and a welding wire feeder 45, so as to make an overlay 46 on the object part 12 of an Al casting 11 with the composite wire 42 as a consumable electrode. In tandem with, and following at a predetermined interval, the MIG welder 43, there is provided a TIG torch 15, whose duty is to remelt the overlay 46 the MIG welder 43 has made into a remelted alloy layer 47 as in the first embodiment.

The advantages of this embodiment are, in addition to the improved productivity owing to the high speed welding by the MIG welder, the greatly improved heat resistance, the effective prevention of weld defects such as cracks and blowholes and the greatly improved qualities of the remelted alloy layer 47 owing to the special properties of the composite wire 42 containing the capsule particles 35 to make dissolution of the additive particularly easy and alloying highly homogeneous. The function required of the composite wire 42 being as described above, the use of other metals such as Cu and Cu alloys for the sheathing 41 is entirely allowable, as long as they have a decent solubility in the base metal. Also, the use of other sources of high density energy such as electron beam, laser beam, plasma arc and the like for the TIG torch 15 is admissible as in the foregoing embodiments.

We claim:

1. A method of strengthening an aluminum casting, comprising the steps of:
    encapsulating a core particle made from a heat resisting element with particles made from a metal soluble in Al to form a capsule particle;
    applying a first electric arc to a local part of the aluminum casting so as to melt the local part;
    spraying a plurality of capsule particles over the melted local part to form an overlay, the encapsulating particles serving as a binding material between the aluminum casting and the core particle; and
    applying a second electric arc of high density energy to the overlaid local part so as to remelt the overlaid local part and form a remelt alloy layer.

2. The method of claim 1, wherein the step of applying the first electric arc is performed by plasma welding.

3. The method of claim 2, wherein the step of applying the second electric arc is performed by a TIG torch.

4. The method of claim 2, wherein the step of applying the second electric arc is performed with any one of an electron beam, laser beam and plasma arc.

5. The method of claim 4, wherein the powders of heat resisting element are Ni powders.

6. The method of claim 4, wherein the heat resisting element is Cr or Mo.

7. The method of claim 1, wherein the core particle is a Ni particle.

8. The method of claim 7, wherein the encapsulating particles are Al particles.

9. The method of claim 1, wherein the core particle is a Cr or Mo particle.

10. The method of claim 9, wherein the encapsulating particles are made from Cu or Cu alloy.

11. A method of strengthening an aluminum casting, comprising the steps of:
    manufacturing a composite wire by filling a sheathing with capsule particles made by encapsulating a core particle made from a heat resisting element with particles made from a metal soluble in Al:
    applying a first electric arc to the specified part of the casting with the composite wire as a consumable electrode, so as to form an overlay on the specified part;
    applying a second electric arc of high density energy to the overlaid specified part so as to remelt the overlaid specified part.

12. The method of claim 1, wherein the core particle is Ni.

13. The method of claim 12, wherein the encapsulating particles include Al.

14. The method of claim 12, wherein the core particle is Cr or Mo.

15. The method of claim 1, wherein the encapsulating particles are Cu or Cu alloy.

16. The method of claim 15, wherein the sheathing is made from a metal that is soluble in Al and is ductile.

17. The method of claim 16, wherein the step of applying a first electric arc is performed by a MIG welding technique using a MIG welder.

18. The method of claim 17, wherein the step of applying a second electric arc is performed using a TIG welding torch.

19. The method of claim 17, wherein the step of applying a second electric arc is performed using any of an electron beam, laser beam and plasma arc.

* * * * *